United States Patent
Miller et al.

(10) Patent No.: US 6,611,630 B1
(45) Date of Patent: Aug. 26, 2003

(54) METHOD AND APPARATUS FOR AUTOMATIC SHAPE CHARACTERIZATION

(75) Inventors: Michael I. Miller, Jackson, NH (US); John G. Csenansky, Clayton, MO (US); Ulf Grenander, Providence, RI (US); Sarang Joshi, Baltimore, MD (US); John W. Haller, Iowa City, IA (US)

(73) Assignees: Washington University, St. Louis, MO (US); Brown University Research Foundation, Providence, RI (US)

( * ) Notice: Subject to any disclaimer, the term of this patent is extended or adjusted under 35 U.S.C. 154(b) by 0 days.

(21) Appl. No.: 09/326,657

(22) Filed: Jun. 7, 1999

Related U.S. Application Data

(63) Continuation-in-part of application No. 08/678,628, filed on Jul. 10, 1996, now Pat. No. 6,009,212.
(60) Provisional application No. 60/088,367, filed on Jun. 8, 1998.

(51) Int. Cl.[7] .................................................. G06K 9/00
(52) U.S. Cl. ....................................... 382/293; 382/128
(58) Field of Search ................................. 382/128, 159, 382/224, 131, 276, 286, 293; 600/300

(56) References Cited

U.S. PATENT DOCUMENTS

| | | | |
|---|---|---|---|
| 4,722,056 A | | 1/1988 | Roberts et al. |
| 5,092,343 A | * | 3/1992 | Spitzer et al. ............... 128/733 |
| 5,187,658 A | * | 2/1993 | Cline et al. ............ 364/413.13 |
| 5,368,030 A | | 11/1994 | Zinreich et al. |
| 5,399,146 A | | 3/1995 | Nowacki et al. |
| 5,402,801 A | | 4/1995 | Taylor |
| 5,465,308 A | | 11/1995 | Hutchenson et al. |

(List continued on next page.)

OTHER PUBLICATIONS

Getz, Neil H. et al., "Dynamic Inversion and Polar Decomposition of Matrices", 1995, IEEE, Jun. 1995.*
PCT Written Opinion; International Application No. PCT/US99/12698; Aug. 7, 2000.
Neil H. Getz and Jerrold E. Marsden; "Dynamic Inversion and Polar Decomposition of Matrices" Proceedings of the 34th Conference on Decision and Control, New Orleans, LA; Dec. 1995; pp. 142–147.
Lavallee et al., "Matching of Medical Images for Computed and Robot Assisted Surgery," *TIMB–TIM3–IMAG, Faculte de Medecine de Grenoble*.
Kaufman et al., "New Head–Positioning System for Use with Computed Tomographic Scanning," *Neurosurgery*, vol. 7, No. 2, pp. 147–149 (1980).
Bajesy et al., Abstract, pp. 435–441 (1981).

(List continued on next page.)

*Primary Examiner*—Yon J. Couso
(74) *Attorney, Agent, or Firm*—Senniger, Powers, Leavitt & Roedel

(57) ABSTRACT

A method and apparatus for classifying population states based on shape characterizations of sub-manifolds of points, curves, surfaces, or sub-volumes. A structure is examined using, for example, clinical imaging techniques such as CT, MRI, or Ultrasound. The image is then subjected to a transform function to generate a map of the new image. The new image map which contains information regarding the shape of the structure is compared to average shapes characterizing population groups. If the shape of the new image falls within a best match probability with an average shape, the new image is classified as a member of the population characterized by the average shape. Each population represents a specific classification state.

Thus, if the shape of the new structure resembles the average shape of a population group, the new shape is classified as the same population state as the other structures displaying the same shape characteristics.

38 Claims, 7 Drawing Sheets

U.S. PATENT DOCUMENTS

| | | |
|---|---|---|
| 5,483,961 A | 1/1996 | Kelly et al. |
| 5,526,444 A * | 6/1996 | Kopec et al. ............... 382/233 |
| 5,568,809 A | 10/1996 | Ben-haim |
| 5,572,999 A | 11/1996 | Funda et al. |
| 5,588,430 A | 12/1996 | Bova et al. |
| 5,630,431 A | 5/1997 | Taylor |
| 5,675,720 A | 10/1997 | Sato et al. |
| 5,676,673 A | 10/1997 | Ferre et al. |
| 5,695,500 A | 12/1997 | Taylor et al. |
| 5,695,501 A | 12/1997 | Carol et al. |
| 5,711,299 A | 1/1998 | Manwaring et al. |
| 5,740,274 A | 4/1998 | Ono et al. |
| 5,747,362 A | 5/1998 | Funda et al. |
| 5,747,767 A | 5/1998 | Raab |
| 5,755,725 A | 5/1998 | Druais |
| 5,772,594 A | 6/1998 | Barrick |
| 5,795,294 A | 8/1998 | Luber et al. |
| 5,799,055 A | 8/1998 | Peshkin et al. |
| 5,800,535 A | 9/1998 | Howard, III |
| 5,823,958 A | 10/1998 | Truppe |
| 5,833,608 A | 11/1998 | Acker |
| 5,834,759 A | 11/1998 | Glossop |
| 5,836,954 A | 11/1998 | Heilbrun et al. |
| 5,848,967 A | 12/1998 | Cosman |
| 5,851,183 A | 12/1998 | Bucholz |
| 5,868,675 A | 2/1999 | Henrion et al. |
| 5,871,018 A | 2/1999 | Delp et al. |
| 5,871,445 A | 2/1999 | Bucholz |
| 5,871,487 A | 2/1999 | Warner et al. |
| 5,891,157 A | 4/1999 | Day et al. |
| 5,904,691 A | 5/1999 | Barnett et al. |
| 5,920,395 A | 7/1999 | Schulz |
| 5,921,992 A | 7/1999 | Costales et al. |
| 5,999,840 A | 12/1999 | Grimson et al. |
| 6,112,112 A | 8/2000 | Gilhuijs et al. |
| 6,175,655 B1 | 1/2001 | George, III et al. |
| 6,278,457 B1 | 8/2001 | Bernardini et al. |
| 6,300,958 B1 | 10/2001 | Mallet |
| 6,366,800 B1 | 4/2002 | Vining et al. |
| 6,393,159 B1 | 5/2002 | Prasad et al. |

OTHER PUBLICATIONS

Batnitzky et al., "Three–Dimensional Computer Reconstructions of Brian Lesions from Surface Contours Provided by Co9mputed Tomography: A Prospectus," *Neurosurgery*, vol. 11, No. 1, Part 1, pp. 73–84 (1982).

Kelly et al., "Pecision Resection of Intra–Axial CNS Lesions by CT–Based Stereotactic Craniotomy and Computer Monitored $CO_2$ Laser," *Acta Neurochirurgica*, 68, pp. 1–9 (1983).

Foley et al., "Fundamentals of Interactive Computer Graphics.".

G. Bartzokis et al., "Reliability of in vivo Volume Measures of Hippocampus and Other Brain Structures Using MRI", *Magnetic Resonance Imaging*, 11, p. 993–1006 (1993).

G.D. Pearlson et al., "Magnetic Resonance Imaging IN Psychiatry", *Annual Review of Psychiatry*, 12, pp. 347–382 (1993).

PCT International Search Report, PCT/US99/12698, Oct. 21, 1999.

* cited by examiner

METHOD AND APPARATUS FOR AUTOMATIC SHAPE CHARACTERIZATION

This is a continuation-in-part of prior U.S. patent application Ser. No. 08/678,628 filed Jul. 10, 1996, now U.S. Pat. No. 6,009,212. This continuation-in-part claims priority to U.S. patent application Ser. No. 08/678,628, incorporated by reference herein. This continuation-in-part also claims priority to U.S. provisional application No. 60/088,367 filed Jun. 8, 1998, which is incorporated by reference herein.

This work was supported in part by the following U.S. Government grants: NIH grants RR01380 and R01-MH52138-01A1 and ARO grant DAAL-03-86-K-0110, NSF grant BIR-9424264 and a grant from the Whittaker Foundation. The U.S. Government may have certain rights in the invention

BACKGROUND OF THE INVENTION

1. Field of Invention

The present invention relates to a method and apparatus for classifying structural anomalies by characterizing the shape changes via their bounding surfaces and comparing the shape changes with shape measures representing known populations.

2. Background Art

Detection of subtle changes in shape of structures can often times be of critical importance for detecting anomalies that are potential indicators of defect or disease. Minor shape changes of structures can often have major catastrophic results. For example, deformation in building construction components may lead to a significant decrease in structural integrity of the entire construction. Also, for example, minor deformations in high resolution, complex machined parts may lead to incompatibility with other machined parts and ultimately to the degradation of the machined device's performance. Additionally, alterations of the shape of human anatomical organs may, for example, be an early warning sign of disease such as cancer. In each of these case, early detection of shape anomalies may be of critical importance.

Often diseases which affect human anatomical organs alter the shape of the diseased organ. For example, cancer mutates organ cells to create abnormal tumor growths. In addition, recent discoveries have revealed that diseased brains suffering from schizophrenia display abnormal shapes and growths. Early detection of these abnormal shapes and growths are of great benefit to the patient and physician in order to begin treatment as soon as possible.

Presently, diagnosis of many diseases requires painful, invasive testing. For example, a biopsy of suspected diseased tissue is often required to determine if a disease exists within the human body. While non-invasive imaging techniques such as MRI, CT and Ultrasound exist and provide valuable information regarding injury, such techniques provide little to no assistance in directly quantifying structural changes used in the diagnosis of disease.

Conventional methods for characterizing human brain disease involves no automation for characterizing shape change associated with bounded volumes and their connected surfaces. The most common approach to defining human brain disease is the comparison of the total volumes of selected brain substructures. Volume determinations are usually made using manual techniques of outlining or counting stereological points around and within the selected volume. This approach can only detect the presence of human brain disease associated with differences in total brain substructure volume and where the magnitude of such differences exceeds the degree of error associated with making manual measurements.

Many human brain diseases, such as Alzheimer's disease, Parkinson's disease, schizophrenia, as well as attention deficit and learning disorders of childhood are known to be associated with small brain volume differences and therefore cannot be detected using manual methods. Accurate automated methods of generating volume measures and global scale transformations provide a methodology for accurate representation of disease based on scale and volume representation. Since abnormalities of neuronal architecture have been associated with these same diseases, it is likely that the innovations described herein will discriminate individuals with these diseases from normal individuals, and allow treatment to begin. In addition, diseases associated with asymmetry can be examined using the advances described herein as well.

Shape characterization is a method which allows a user to determine abnormalities and changes in shape of structures. Such shape characterization has a multitude of practical applications. For example, shape characterization techniques may provide a means to detect shape changes in human anatomical organs. Also, for example, shape characterization may provide a means to achieve quality control in automated inspections of structural elements.

Shape characterization of human anatomical organs may provide a non-invasive manner in diagnosing abnormal growths, diseases and potential health risks. Cancerous organs with abnormal shapes might be quickly identified without the need for invasive diagnostic techniques. Automated shape characterization of the brain can detect subtle changes in brain volume not presently possible by conventional methods.

*Gaussian Random Fields on Sub-Manifolds for Characterizing Brain Surfaces*, Sarang C. Joshi et al., incorporated herein by reference, discloses a method of using computer hardware and computer software for automated characterization of human brain substructures and the associated disease. Specific diseases have been studied and the alterations of shape on human organs have been observed and classified. By image comparison with known classified diseased organ shapes, early, non-invasive, detection of diseases may be achieved.

One disadvantage of conventional methods is the inability to detect the critical subtle changes in human organs such as the brain. Another disadvantage of conventional diagnostic methods of human organs is that they require invasive techniques. As early detection and non-invasive methods are goals of disease diagnosis, it would be desirable to provide a means and method for disease diagnosis through the use of shape characterization. While the preferred embodiment of this invention is in the characterization of human anatomy, it should be noted that the present invention is not limited to biological application. In addition, characterizing shapes of non-biological structures such as automated inspection of parts for quality control, for example, may be accomplished.

SUMMARY OF THE INVENTION

The present invention overcomes the above-described disadvantages, and provides a method and apparatus for automated shape characterization. The present invention also provides a method and apparatus for automated shape characterization that allows for the detection of disease by means of non-invasive imaging techniques. Additional features and advantages of the invention will be set forth in part in the description which follows, and in part will be apparent from the description, or may be learned by practice of the invention. The objectives and other advantages of the invention will be realized and attained by means of the elements and combinations particularly pointed out in the appended claims.

According to the present invention, to achieve these and other advantages and in accordance with the purpose of the invention, as embodied and broadly described herein, a method and apparatus consistent with the present invention automatically classifies shapes, for example, automatically classifying populations via shape characterizations of sub-manifolds of points, curves, surfaces and sub-volumes. Where a population is a group of individuals exhibiting a common characteristic, also referred to as a class. A method consistent with the present invention includes the steps of: 1) acquiring images of structures using conventional techniques and from the acquired image, creating a complete map based on a transform function; 2) creating a database of known shape and volume changes associated with known classification, e.g. disease populations and classifying the images based on classification characteristics; 3) characterizing the shape of a population by creating a mean composite sub-volume and mean composite bounding surface by averaging the transform maps of images classified together in the same population; 4) determining a variation around the mean composite sub-volume and bounding surfaces using the family of transform maps; and 5) determining the probability that a new structure under study belongs in a particular population based on its shape.

A method consistent with the present invention includes creating a database of known normal and diseased states of a particular structure, comparing the image of a structure under study with the images of the database and using a probability distribution function to determine whether the image under study is closer to a known anomalous image or to a normal state image. The method makes this determination based on the results of the probability distribution function which calculates the difference between a target and a template image and the probability of a match.

It is to be understood that both the foregoing general description and the following detailed description are exemplary and explanatory only and are not restrictive of the invention, as claimed.

BRIEF DESCRIPTION OF THE DRAWINGS

Other features and advantages of the present invention will become apparent in the following detailed description of the preferred embodiment, with reference to the accompanying drawing, of which.

DETAILED DESCRIPTION OF THE PREFERRED EMBODIMENTS

Figure 1:
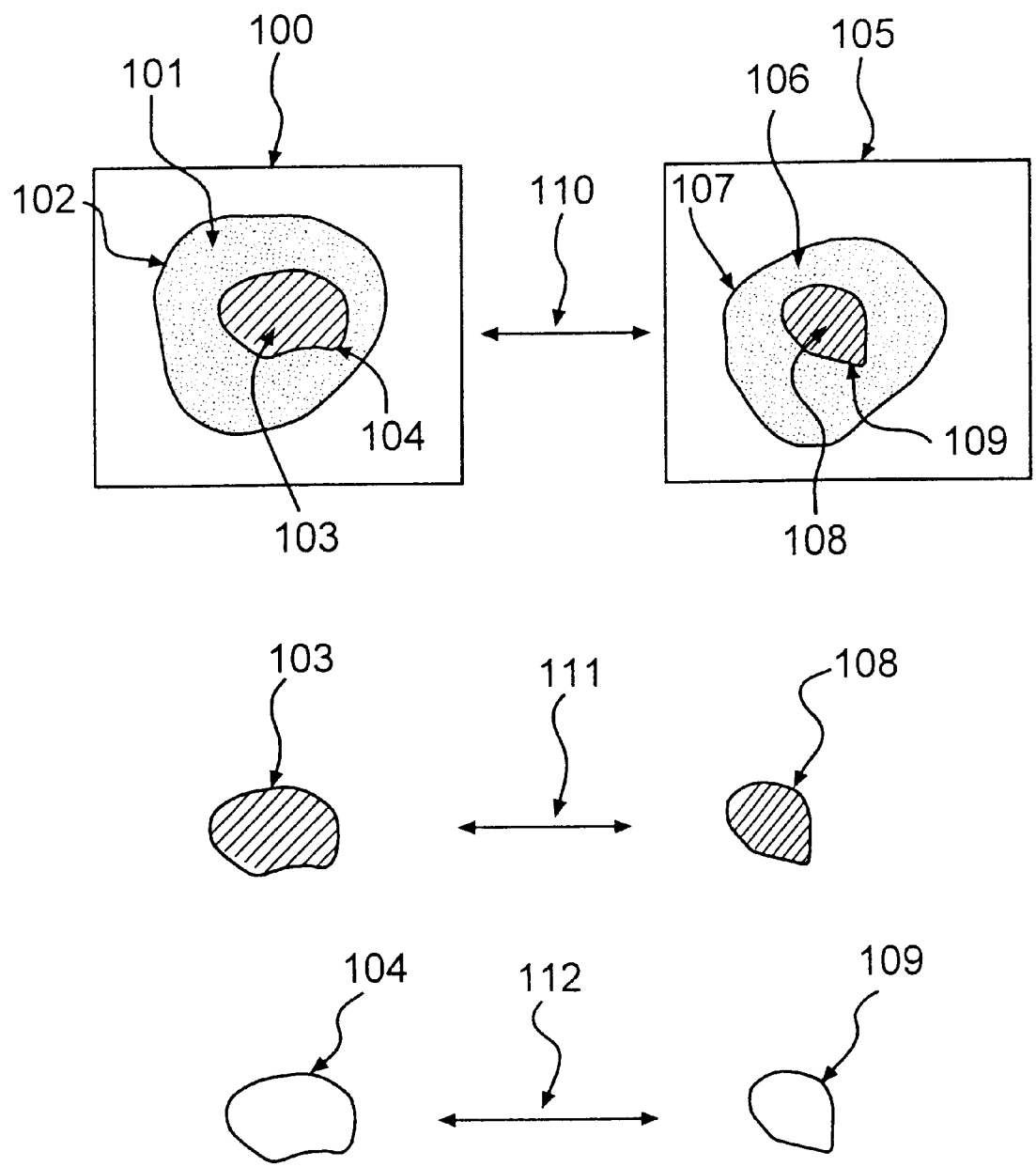
FIG. 1 depicts the template image with a substructure and its bounding surface identified in the template and mapped on to a target image.

According to the present invention, a method and device are provided to detect and classify anomalies via shape characterizations of sub-manifolds of points, curves, surfaces or sub-volumes. In an embodiment of the present invention, a method and apparatus automatically characterizes human brain substructures and diseases associated with neuromorphmetric abnormalities in these brain substructures. The method characterizes the shape changes of brain substructures via their bounding surfaces using a series expansion of the vector fields associated with the volume and shape of the bounding surface of the substructures selected for analysis as it deviates from other individuals in populations. Reference will now be made in detail to the present preferred embodiment of the invention, examples of which are illustrated in the accompanying drawings.

A database of known normal and disease state images is created, by an expert in the field or by known techniques in the art, of the subject under study. In a preferred embodiment a doctor studying brain disease uses clinical imaging techniques such as, for example, CT, MRI, and Ultrasound to acquire an image of a patient's brain. As each patient's brain is imaged, the doctor or operator enters additional information associated with the image into the database. This additional knowledge includes information regarding a diagnosis of a particular disease that afflicts the patient's brain. The additional information helps to classify the image when organized in the database.

The acquired image is then subjected to the automated volume matching transform function described in U.S. patent application Ser. No. 08/678,628, now U.S. Pat. No. 6,009,212, which is incorporated herein by reference. An automatic volume matching transform function automatically generates a complete mapping of one domain to another, expressed symbolically as h:Ω↔Ω on the entire volume of the acquired image. The transform function generates a map of the region Ω of the image. The transform function used to generate a map of the region may be any of the mapping transform functions described in the U.S. Pat. No. 6,009,212, for example, the transform function described in Equations (6) and (7) of U.S. Pat. No. 6,009,212, as well as any other transforms known in the art to generate a target map. The target map being a generated map of the transformed new image. The new image being the image of a structure presently being examined or under study. In an embodiment, these maps are restricted to preselected embedded submanifolds, and automatically carry the template anatomical information onto the target anatomy. This embodiment provides an automated method for understanding the neuroanatomy of the target image. The template image is a map stored in the database formed by the transformed mapping of previously examined images. These maps can be extended as well to include the mapping technology disclosed in U.S. Pat. No. 6,009,212 and associated with tumors and other morphometry changing normal and or disease states.

The various acquired images are entered into the database and classified into different classes (populations) representing various states of the brain. These states include normal brain states and different disease brain states. Each different disease brain states include images of various brains suffering from brain cancer, Alzheimer's disease, Parkinson's disease, schizophrenia, and attention deficit and learning disorders of childhood. Likewise, the normal brain state includes images of various brains in a normal state. The collection of images and their respective transformed maps associated with each population are arranged to represent the various substructures of each of the various populations. Over time, a database is created of image maps which correspond to either normal or one of a disease state. Those skilled in the art and also skilled in recognizing that image map databases representing several possible classifications can be automatically generated and maintained either without manual intervention or with varying degrees of physician or operator intervention.

As each new image is classified, the template image of the image previously stored in the population is transformed with the map of the new image under study. A statistical measure, such as for example, a mean composite sub-volume or bounding surface is generated which represents the average shape characteristic of each population. Over time, the characteristic average image is refined as new images are classified into the population. The populations are characterized and distinguished from one another using probability distribution function measures corresponding to the different populations. For example:

$$\text{Population}_0: P_0, \text{Population}_1: P_1, \ldots, \text{Population}_N: P_N \quad (1)$$

where $P_0, P_1, \ldots, P_N$ represents the probability distribution function for each defined populations. The probability distribution functions are constructed for each population from a training set of individuals belonging to the population using a preselected inclusion and exclusion criteria known to the doctor or operator.

Once an adequate database is established and a new patient's brain is received for study, its image is acquired using clinical examination techniques such as CT, MRI, or Ultrasound. The image of the brain under study is then subjected to any and all of the mapping transform functions described in U.S. patent application Ser. No. 08/678,628, for example, the transform functions shown in Equations (6) and (7) of U.S. patent application Ser. No. 08/678,628, as well as any other transforms known in the art to generate a target map of the brain image under study. The mapped target image is then compared to the template images of each population stored in the database. The probability distribution functions developed are used to determine whether the brain image under study falls within the probability distribution function of a particular population. Thus, the image of the brain under study may be properly diagnosed as corresponding to either the normal or disease state population. The new brain image is classified according to disease state and its variation of shape is then transformed using computed statistics, such as for example, the mean composite sub-volumes or mean composite bounding surfaces to create new: mean composite sub-volumes or new mean composite bounding surfaces which account for the new image's variation.

An embodiment of the present invention is suited for the study of normal and disease populations of schizophrenics. In this embodiment, we assume a database has previously been established with a population of images representing normal brain states and a population of images representing diseased brains suffering from schizophrenia. The probability distribution functions for this example are constructed from a population of individuals defined as normal using preselected clinical inclusion and exclusion criteria. The disease shape change measure is constructed from populations of individuals diagnosed with the disease.

The computer classification of the disease state as manifest via neuramorphometric abnormality expands the transforming vector fields u(x) by using a $IR^3$ valued complete orthonormal basis $\{\phi_k(x), k=1, \ldots\}$ restricted to the submanifold M(j) according to $$u(x)=\sum_k U_k \phi_k(x), x \in M(j), j=1, 2, 3. \quad (2)$$

Where M(j) is a manifold of dimension j=1, 2, 3; x is a point on the manifold M(j); $\phi_k(x)$ is a $IR^3$ valued basis function; and u(x) is the transforming vector field expanded in the orthonormal basis functions $\phi_k(x)$. The complete orthonormal basis $\{\phi_k(x), k=1, \ldots\}$ is defined respecting the volume, shape, and geometry of the brain substructures.

A. Acquiring an Image and Generating the Transform Map

A template image known to be associated with an image, a target subvolume of interest and a bounding surface, $I_0$, $M_0(3)$, $M_0(2)$, respectively is previously stored in a database. The first step is to construct biologically meaningful subvolume $M_0(3)$ and associated surface $M_0(2)$ in starting volume $\Omega$ with associated image $I_0$ that defines the substructure of interest. A new target image, representing a new unknown brain structure, is acquired using clinical examination techniques such as CT, MRI, or Ultrasound. The template image is then mapped onto the target images to acquire a map of the substructure in interest $I_{NEW}$. The map of the image is accomplished using the automated volume matching transform function described above and in U.S. Pat. No. 6,009,212. The automatic volume matching transform functions automatically generate a complete map $h:\Omega \leftrightarrow \Omega$ on the entire volume of the acquired image. These transforms are invertible. Thus, the map of the new image can be formed by mapping the template image onto the new image (target) or vice versa. A population characterizing the disease state suffering the schizophrenia, made up of N anatomies are measured via their anatomical imagery $I_1, I_2, \ldots, I_N$. Each mapped image $I_1, I_2, \ldots, I_N$ is also generated using the same transform function and template image to acquire a map of the substructure in interest.

This step is shown in FIG. 1. FIG. 1 shows $\Omega$, a background coordinate system for the template image (mean composite image) 100; a template brain 101; a surface of the template brain 102; an identified substructure of the template brain 103; and a bounding surface of the sub-structure of interest in the template brain 104. FIG. 1 also depicts: a background coordinate system of the new image 105; a map of the target image (new image) 106; a surface of the target image 107; a sub-structure of interest of the target image 108; and a bounding surface of the target image 109. Using equation 3, a set of maps is generated using transforms 111 and 112 to map template image 104 onto target image 109.

By using the transform function and generating the sets of maps, subtle changes in the shape and image of the structure can be detected. Through the subtle shape detection, the new image transform map $I_{NEW}$ can be compared to known image maps to determine if the new image map is properly classified within a particular population. The following changes in volume, shape and symmetry allow the doctor to most accurately detect necessary changes in the shape of the structure.

For studying volume, shape and symmetry, the transformation hierarchically is constructed to be the composition $h=h_1 \circ h_2 \circ \ldots h_n$, the transformations supporting the affine motions, symmetry flip, and fine vector field deformation.

For characterizing global scale, define h to be the affine group, consisting of the generalized linear group produced with translation:

$$h(x)=Ax+b, A \in GL(3), b \in IR^3. \quad (3)$$

Where h(x) is the transformation; A is a 3×3 affine matrix; x is a point; b is a 3×1 translation vector; and GL(3) is the Generalized Linear Group of dimension 3.

To study scale and size parameters, use polar decomposition:

$$A=SO, S \in \text{symmetric matrices}, O \in SO(3). \quad (4)$$

Where S is a 3×3 symmetric matrix; O is a 3×3 orthogonal matrix with determinant −1; and SO(3) is the Special Orthogonal group of dimension 3. Elements of the symmetric group have 6 entries encoding scale; SO(3) the special orthogonal group.

To study flip symmetry, let O be in the orthogonal group with determinant −1:

$$A=SO, S \in \text{symmetric matrices}, O \in O(3), \quad (5)$$

where O(3) is the Orthogonal group of dimension 3.

To study high dimensional fine transformation of shape, define h via its associated vector field:

$$h:x \to x-u(x). \quad (6)$$

In order to determine the correct classification of the new image, the variation in the new image must be compared with the probability distribution functions defining each population. If the new image maps falls within the probability distribution functions for a particular population, the new image can be said to be classified as one of that population. The comparison with the probability distribution functions is discussed below.

B. Generating the Average Shape Characterizing Each Population

As a database representing images of brains already examined is constructed, each image classified as a member of a particular population contributes to an average shape characteristic of the population. The average shape includes a mean composite sub-volume and a mean composite bounding surface. For each population, sets of maps are generated which represent the various substructures. To define each population a template image is created that represents the average shape. These are calculated using probability measures on the vector fields restricted to the sub-volumes and associated surfaces. The next step is to apply a hierarchical mapping function of a mean composite anatomy image existing for the disease population to the new image map, generating the set of maps $h_i$, i=1, 2, . . . on the substructures of interest:

$$M_0(j) \xrightarrow{h_i} M_i(j), j=0, 1, 2, 3. \quad (7)$$

Where $M_0(j)$ is a manifold of dimension j=1, 2, 3; $h_i$ is the map generated by the mapping transform mapping $I_0$ to the anatomical imagery $I_i$; and $M_i(j)$ is the computed manifold of dimension j=1, 2, 3, as a result of applying the map $h_i$ to $M_0(j)$.

Figure 2:
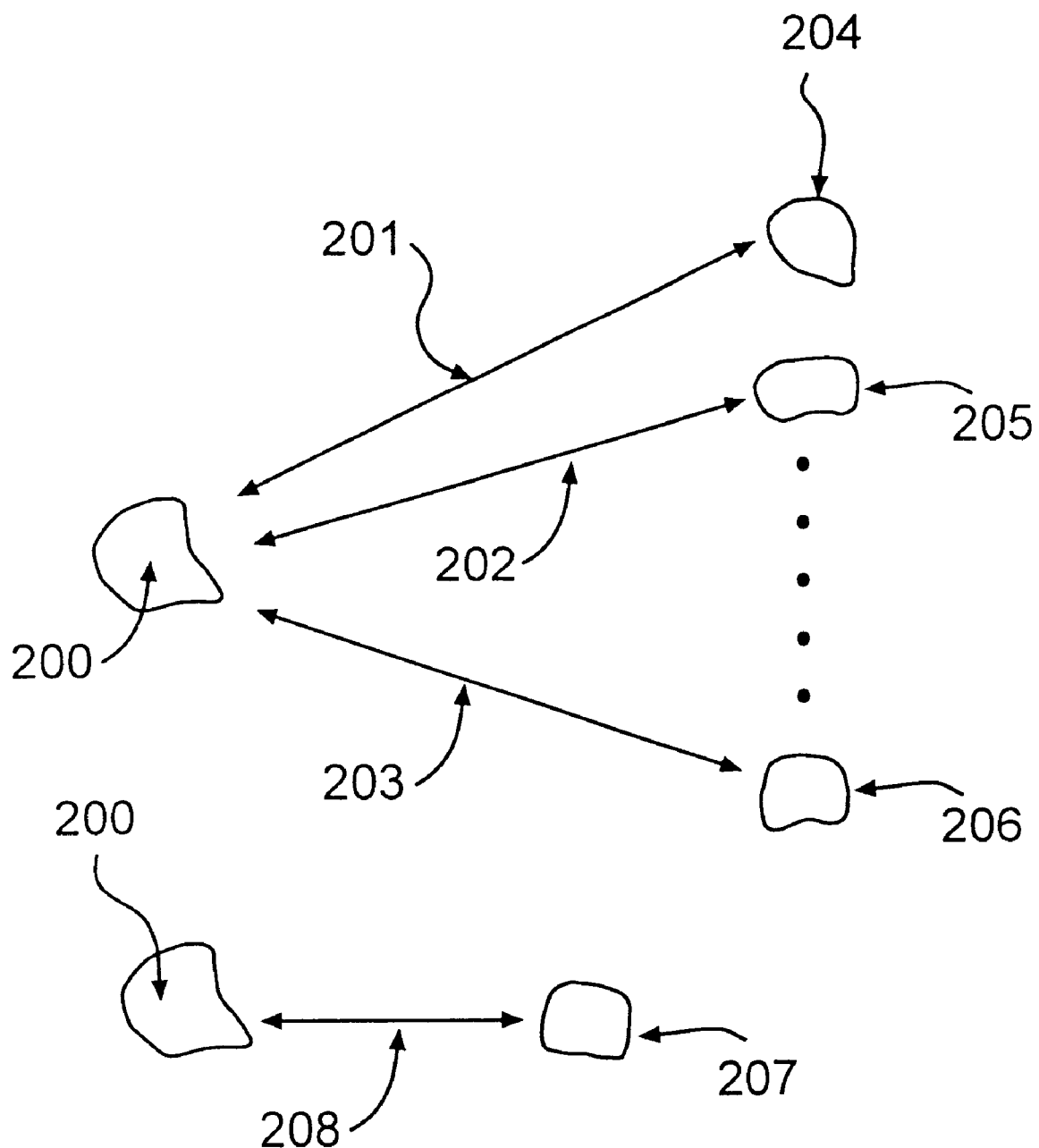
FIG. 2 depicts the mapping of the template sub-volume associated with a substructure of interest on to a family of target sub-volumes.
Figure 3:
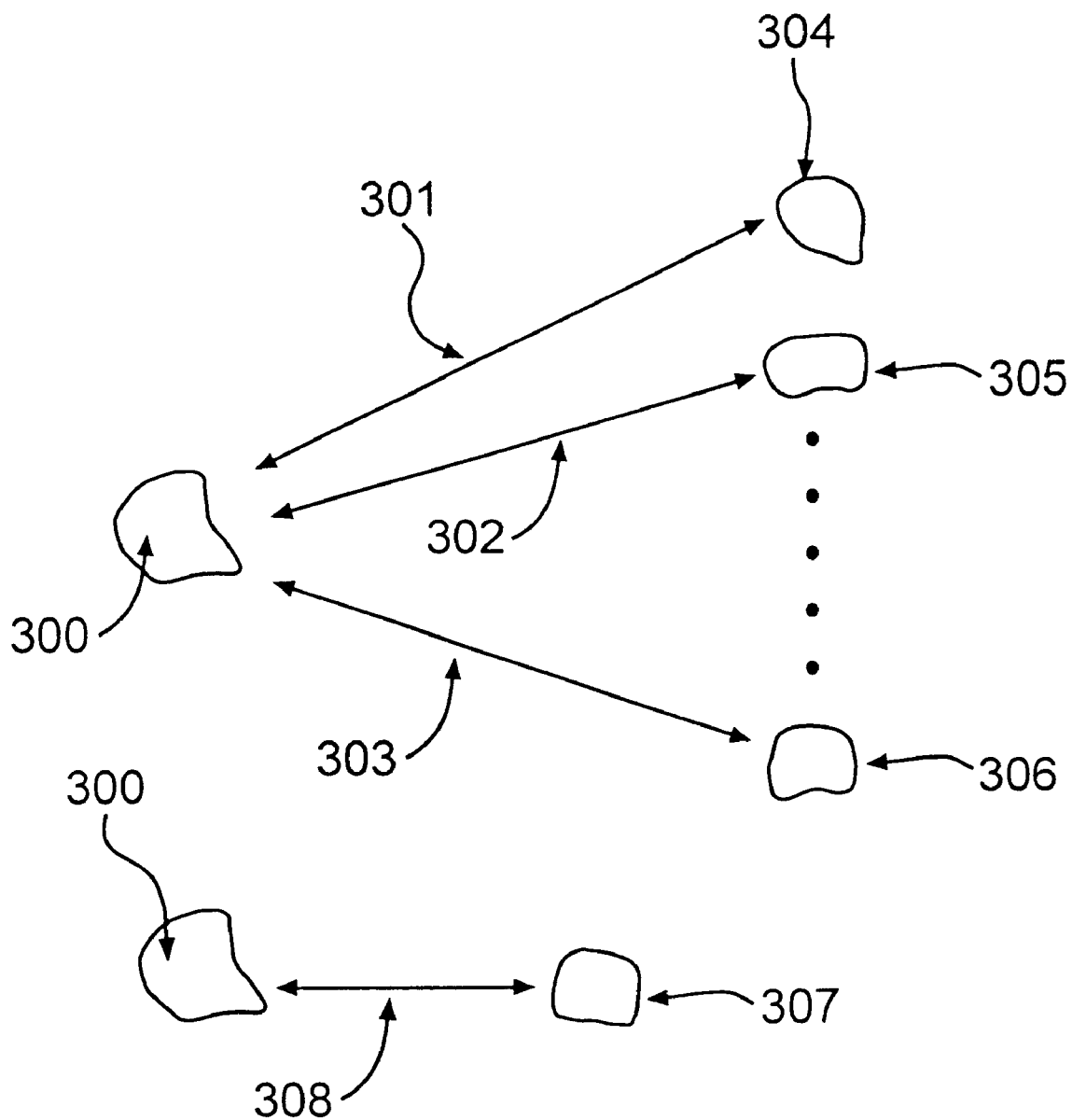
FIG. 3 depicts the mapping of the template bounding surface associated with a substructure of interest onto a family of target bounding surfaces.

FIGS. 2 and 3 depict the calculation of a mean composite sub-volume and a mean composite bounding surface characteristic of the population respectively. In FIG. 2, a new sub-structure of interest 200 is transformed by the template images of the sub-structures of interest existing as members of the population 204–206. To construct a composite representing the populations k=1, . . . , M, as summarized via template sub-manifolds $M_{temp}^k(j)$, j=0, 1, 2, 3, construct the following:

$$M_{temp}^k(j) = M_0(j) \circ \overline{h}^k \equiv \{\overline{h}^k(x) \in \Omega : x \in M_0(j)\}, \quad (8)$$

$$\overline{h}^k = \frac{1}{N} \sum_{i=1}^{N} h_i^k, j = 0, 1, 2, 3.$$

Where $\overline{h}^k$ is the mean transformation for the $k^{th}$ population; $h_i^k$ is the transformation associated with the $i^{th}$ anatomical imagery in the $k^{th}$ population; $M_0(j)$ is the manifold of dimension of j=1, 2, 3; $M_{temp}^k(j)$ is the complete composite template manifold of dimension j=1, 2, 3 representing the kth population as a result of applying the mean transformation $\overline{h}^k$ to $M_0(j)$.

The template images 204–206 are mapped onto the new image of the sub-structure of interest using equation 8. This is depicted in FIG. 2 by 201–203. The resulting map is equivalent to the mapping of the mean composite sub-volume 207, using the transform function onto the template image 200 to form a new mean composite sub-volume of the average shape characteristic of the population. Thus, as each new image is classified as a member of the population, the mean composite sub-volume of the average shape is refined to reflect the addition of the new member of the population.

Likewise in FIG. 3, the mean composite bounding surface of the average shape is refined. In FIG. 3, a new sub-structure of interest 300 is transformed by the template images of the sub-structures of interest existing as members of the population 304–306. To construct a composite representing the global scale and volume of each of the populations k=1, . . . , M construct the average scale:

$$M_{temp}^k = M_0 \circ \overline{h}^k \equiv \{\overline{h}^k(x) \in \Omega : x \in M_0(j)\}, \quad (9)$$

$$\overline{h}^k = \frac{1}{N} \sum_{i=1}^{N} S_i^k; j = 0, 1, 2, 3.$$

Where $S_k^i$ is the scale transformation associated with the $i^{th}$ anatomical imagery in the kth population.

The template images 304–306 are mapped onto the new image of the sub-structure of interest using equation 9. This is depicted in FIG. 3 by 301–303. The resulting map is equivalent to the mapping of the mean composite bounding surface 307, using the transform function onto the template image 300 to form a new mean composite bounding surface of the average shape characteristic of the population. Thus, as each new image is classified as a member of the population, the mean composite bounding surface of the average shape is refined to reflect the addition of the new member of the population.

Thus, an embodiment of the present invention creates average shapes characteristic of the shapes of the sub-structures which are classified as members of a particular population. Thus, when mapped, any new image which matches the average shape of a particular population can be said to be a member of that population. In this embodiment, the average shape of the sub-structure of interest which characterizes the population suffering from schizophrenia will differ in shape from the average shape of the sub-structure in interest which characterizes the population representing a normal state. As new images are acquired, they are mapped and compared to the template images of the average shape of each population. If a match is found to either average shape, the new image is classified as a member of that population. Thus, a disease may be classified based on its shape alone.

C. Determining Probability Distribution Function and the Variation in the Population Around the Average Shape Thus far, however, only averages from the various populations were used. Thus, only an exact or very close matching of the image under study to the defined average of the various states will provide any meaningful classification of new images under study. To benefit from the full power of hypothesis testing, variation measures are used. The hypothesis testing approach allows the present invention to better determine whether a new image under study falls within the probability of being classified with one population over another even though the shape of the new image's structure varies from the average shape characterizing each population. A probability distribution function is generated, by estimating the mean and covariance through Gaussian processes, from the family of maps making up each population. These maps are characterized as Gaussian processes indexed over the scale and size parameters which parameterize and define the vector fields. These Gaussian processes are represented by their mean and covariance operators.

For the scale and size parameters (collectively known as scale groups), the means and covariances of the scale groups are empirically estimated. The affine transformations are decomposed using polar decomposition h=SO+b generating the set of scale matrices S containing 6 parameters. Interpret the scale group as a 6×1 vector, thus the mean $\overline{S}$ is a 6×1 vector, and the covariance $\Sigma_S$ is a 6×6 matrix.

For the vector fields modeling shape change characterize it as a three-dimensional Gaussian random field $\{U(x), x \in M\}$ on the domain $M \subset \Omega$ specified by its mean and covariance. Define $\{U(x), x \in M\}$ to be a Gaussian Random Fields (G.R.F.) on the Hilbert space H with inner product <f,g> of two functions given by $$<f,g> = \int_M f^1(x)g^1(x)dv(r) + \int_M f^2(x)g^2(x)dv(x) + \int_M f^3(x)g^3(x)dv(x) \quad (10)$$

Where $f$ is an $IR^3$ valued function on the domain M; g is an $IR^3$ valued function on the domain M; $f^1$ is the first component of $f$; $f^2$ is the first component of $f$; $f^3$ is the first component off $f$; $g^1$ is the first component of g; $g^2$ is the first component of g; $g^3$ is the first component of g; and du measures domain M and the equation uses mean field $\overline{U}$ and covariance field $K_U$. Notice dv is the appropriate measure on the manifold $M \subset \Omega$; v is the Lebesgue measure for $IR^3$ for $\Omega = [0, 1]^3$, v is a surface measure on the bounding surfaces M(2).

Constructing the $\{U(x), x \in M\}$ Gaussian fields as a quadratic mean limit using a complete $IR^3$-valued orthonormal basis on M, with the basis f $\{\phi_k, k=1, 2, \ldots\}$, and the U-field given according to $$U(x) = \sum_{k=1}^{\infty} U_k \phi_k(x), \ U_k = \langle \phi_k, U \rangle \quad (11)$$

Where: $\phi k(x)$ is an $IR^3$ valued function; $U_k$ is the mean weight associated with the $k^{th}$ basis function; $U(x)$ is the displacement vector field expanded in the orthonormal basis function $\phi_k(\chi)$; <,> is the inner-product defined in Equation (10). Also where $U_k$, are Gaussian random variables with fixed means $\overline{U}_k$ and covariance $\sigma_{ik} = E(U_k - \overline{U}_k)(U_i - \overline{U}_i)$. The mean and covariance operator of the field becomes $$\overline{U}(x) = \sum_{k=1}^{\infty} \overline{U}_k \phi_k(x), \ K_\cup(x, y) = \sum_{ik=1}^{\infty} \sigma_{ik} \phi_i(x) \phi_k^T(y). \quad (12)$$

Where: $\overline{U}k$ is the mean weight associated with the $k^{th}$ basis function; $\overline{U}(x)$ is mean displacement vector field; K(x, y) is the covariance operator of the displacement vector field; and $o_{ik}$ is the covariance of the $i^{th}$ and the $k^{th}$ weights.

The mean and covariance of the scale groups representing the various populations $P_1, \ldots, P_M$ are generated from the set of anatomical maps, SET-h=$\{h_i^k, \ldots, h_N^k\}$, k=1, \ldots, M, specifying the affine groups. For each transformation, use polar decomposition $h_i^k = S_i^k O_i^k + b_i^k$ generating the set of scale matrices $S_i^k$ containing 6 parameters. Interpret the scale group as a 6×1 vector. The estimates for the mean and variances of the populations $\overline{S}^k$, $\sigma^k$ are given by $$\overline{S}^k = \frac{1}{N} \sum_{n=1}^{N} S_n^k, \ \sum_S^k = \frac{1}{N} \sum_{n=1}^{N} S_n^k(S_n^k)^t - \overline{S}_n^k(\overline{S}_n^k)^t; \quad (13)$$

Where $S_i^k$ is the scale transformation associated with the $i^{th}$ anatomical imagery in the $k^{th}$ population; $\overline{S}^k$ is the mean scale transformation for the $k^{th}$ population; and $\Sigma_S^k$ is the estimate of the scale covariance. The mean $\overline{S}$ is a 6×1 vector; the scale covariance $\Sigma_S$ is a 6×6 matrix.

The mean and covariance for the vector fields is estimated from the family of maps SET-U. The generation of the probability representing the normal and disease states estimates the mean and covariance of the random variables $U_k$, $U_k = \langle \phi_k, U \rangle$ representing the populations of maps, $(\overline{U}_k, \sigma_{ik})$. Given are a set of anatomical maps, normal and disease SET-U=$(u_1, \ldots, u_N)$ from a Gaussian random field with mean-field and covariance $(\overline{U}, K_U)$.

The maximum-likelihood estimates for the mean and variances of the two populations normal, disease are given by $$\overline{U}_k^N = \frac{1}{N} \sum_{n=1}^{N} U_{kn}^N, \ \sum_U^N = \frac{1}{N} \sum_{n=1}^{N} (U_{kn}^N - \overline{U}_k^N)(U_{kn}^N - \overline{U}_k^N)^t; \quad (14)$$

Where $U_{nk}^N$ is the weight associated with the $k^{th}$ basis function of the $n^{th}$ displacement vector field of the normal population; $\overline{U}_k^N$ is the mean weight associated with the $k^{th}$ basis function of the normal population; and $\Sigma_U^N$ is the covariance of associated with the normal population.

$$\overline{U}_k^D = \frac{1}{N} \sum_{n=1}^{N} U_{kn}^D, \ \sum_U^D = \frac{1}{N} \sum_{n=1}^{N} (U_{kn}^D - \overline{U}_k^D)(U_{kn}^D - \overline{U}_k^D)^t; \quad (15)$$

Figure 4:
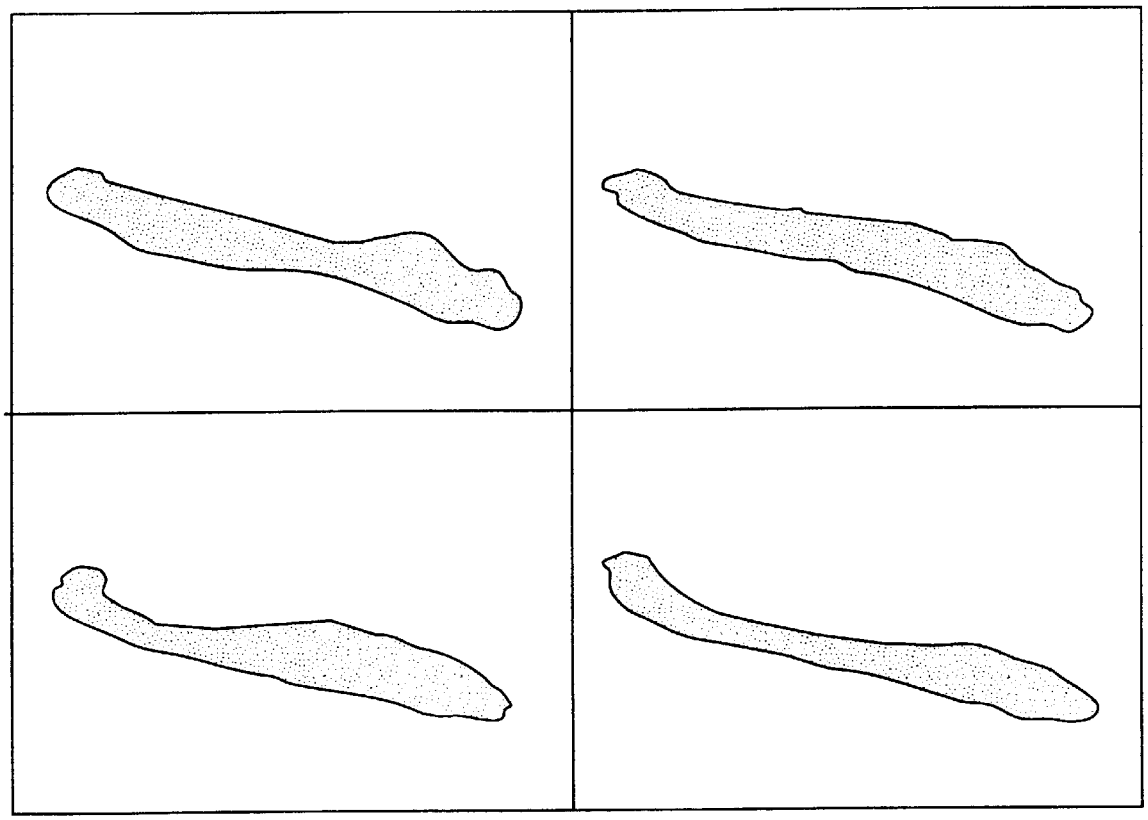
FIG. 4 depicts four surface harmonics computed using the commercially available Automatic Dynamic Incremental Non-Linear Analysis (ADINA) software package associated with the surface of the hippocampus of a brain for expanding vector fields.

To illustrate, shown in FIG. 4, are samples from a complete orthonormal basis $\{\phi_k\}$ for expanding vector fields on the surface, in this case the hippocampus. The complete orthonormal basis of the surface are constructed numerically using finite elements codes, such as ADINA for example, or empirical eigenfunction methods. The complete orthonormal base can be generated for any smooth geometry. Four harmonics of the orthonormal base specific to the hippocampus geometry are illustrated in FIG. 4. These are depicted as deviations around the template geometry. The panels show the graph of points generated by $\{x + \phi_k(x), x \in M(2)\}$, and $\phi_k$ the k-th harmonic. Thus, it is shown in FIG. 4, various deviations from the mean composite image that still fall within the image probability distribution function of a particular population.

Figure 5:
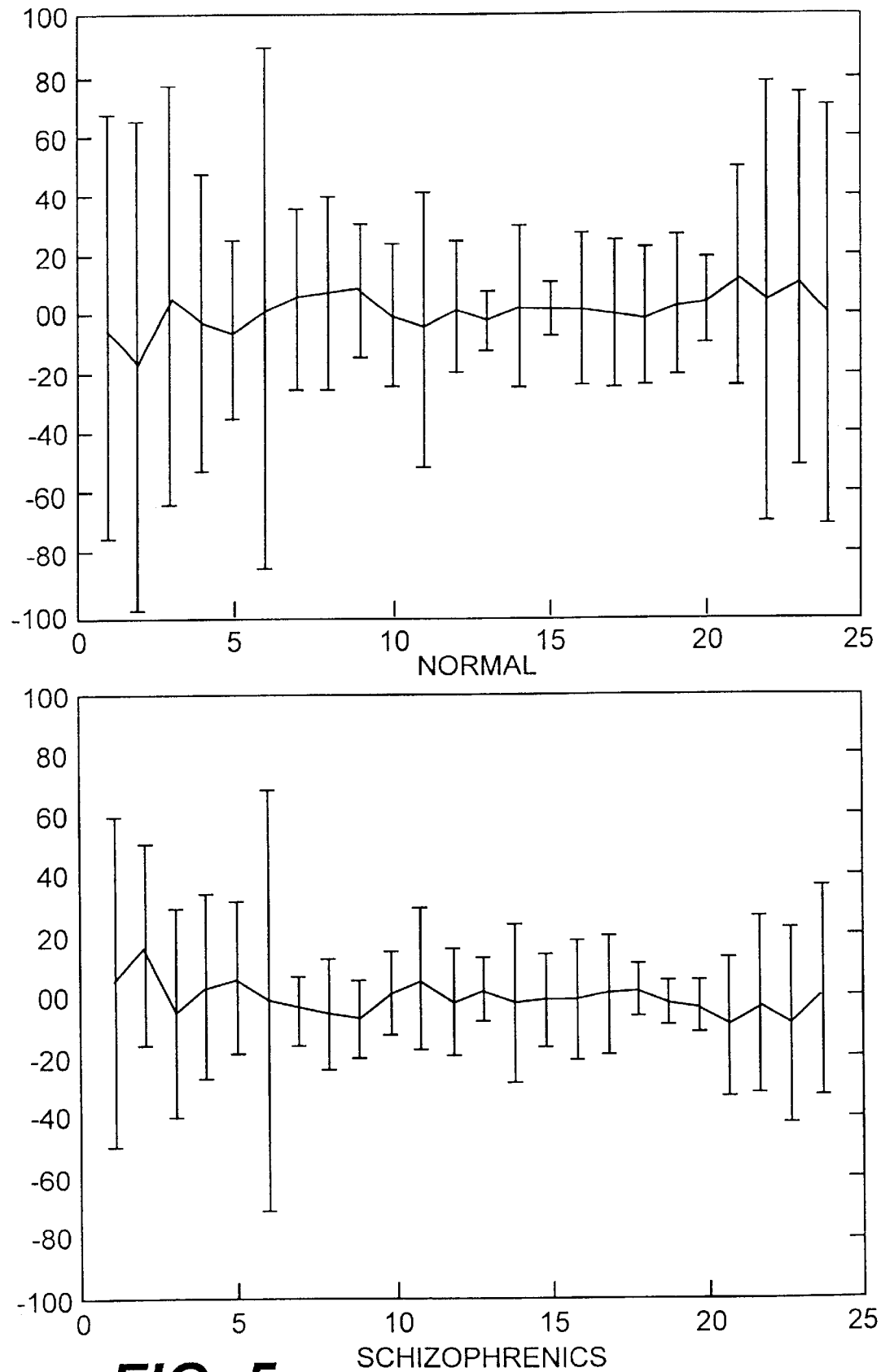
FIG. 5 depicts a plot of the mean and standard deviation as error bars obtained from maps for normal brains and brains of patients suffering from schizophrenia for the first 25 surface harmonics.

The left panel of FIG. 5 shows the mean template constructed from ten brains $\bar{h}oM_0(2)$. Shown in the middle and right panels of FIG. 5 are the maximum-likelihood estimates of the means and variances ($\bar{U}_k, \sigma_k^2$) of the first 25 surface harmonics representing maps from the provisory template. The middle panel shows the means $\bar{U}$ of the first 25 surface harmonics representing deviation of the population of four anatomies from the provisory template. The right panel shows the variances, $\sigma^2$.

Thus, having computed the function of mean and covariance for the population an embodiment of the present invention can automatically diagnosis a disease state based on changes in the structure shape.

D. Automated Diagnosis of Disease State Via Deviation Morphometric Change

In order to automatically diagnose a disease state based on shape characterization, the template image is transformed onto the mapped new image (target image) to determine the deviation of the mapped new image from the average shape which characterizes each population. Once the mapped new image is determined to fall within the variation limits of a particular average shape, characterizing a population, the probability distribution functions that have been established determine whether the new image can be classified as a member of that population. Each population is represented by a particular shape of the structure characterizing that population which in turn represents a particular disease or normal state.

For example, when there is one disease state corresponding to a deviation of the basic normal anatomical state. Accordingly, there will be two possible diagnosis, or hypothesis, $H_0$ and $H_1$, where $H_0$=Normal, $H_1$=Disease. This corresponds to modification of the basic anatomical configuration I, where I represents new image, into another I', where I' represents the map of the new image, via the diffeomorphism h'∈H: I'=h'I, so that the anatomies are topologically equivalent. In this setting, disease corresponds to the existence of two probability distribution functions $P_0 >> P_1$ representing large deviations of one to another, with the assumption that the topological structures of the normal human anatomy are preserved. If the deformation operator h∈H is too far from the identity element in the similarity group so that it falls outside of a confidence set of the null hypothesis, $H_0$, we can identify this kind of abnormality by estimating the probability density p(h) and applying the Neyman-Pearson lemma to arrive at an appropriate decision.

Under the null normal and disease hypotheses, the random deformation have densities $H_0: p_0(h)$, $H_1: p_1(h)$. Assume the new image I is generated of a particular patient's anatomy, the goal is to diagnose disease. Then the preferred test becomes $$W = h: \frac{P_1(h)}{P_0(h)} \geq \alpha. \tag{16}$$

The constant $\alpha$ representing a biasing constant determined by the probability a new image will be a member of either population. For example, when the probability that a new image is a member of either population is equal, such as either being male or female, the constant becomes 1. The constant represents prior knowledge of the probability that the new image is of a particular population.

Thus, in order to perform the automated diagnosis, a method consistent with the present invention calculates representations of normal and disease states associated with the composite templates and sample mean and variance statistics for both normal and disease separately generated from population statistics characterizing these states, $\bar{U}^N = \bar{U}_k^N, \Sigma^N = (\sigma_{ik}^N), \bar{U}^D = \bar{U}_k^D, \Sigma^D = (\sigma_{ik}^D)$:

$$M_{temp}^N(j) \doteq M_0(j) o \bar{h}^N, \ M_{temp}^N(j) \doteq M_0(j) o \bar{h}^D \tag{17}$$

Where $M_0(j)$ is a manifold of dimension j=1, 2, 3 in the Image $I_0$ representing the substructure of interest of the Normal population; $M_{temp}^N(j)$ is a manifold of dimension j=1, 2, 3 representing the mean substructure of interest of the Normal population; $M_{temp}^D(j)$ is a manifold of dimension j=1, 2, 3 representing the mean substructure of interest of the Disease population; $\bar{h}^N$ is the mean transformation associated with the normal population; and $\bar{h}^D$ is the transformation associated with the Disease population.

The mapped template image to image of the patient's brain is calculated according to:

$$I_0 \xrightarrow{} I, M_0(j) \xrightarrow{} M(j), j=0, 1, 2, 3. \tag{18}$$

This map is compared with the average shapes characterizing each population and the Bayesian hypothesis test, described below, determines which is the most probable match of population characteristic for the mapped image.

The preferred test statistics are then computed for k=1, ..., D where D is the dimension of test.

For scale transformations, optimal test statistics $S_k$, k=1, ... 6 for n-th anatomy becomes $S_{nk}$ k-th entry polar decomposition $$h_n = S_n O_i + b_n, \ S_n = \begin{pmatrix} S_{n1} \\ \cdot \\ \cdot \\ \cdot \\ S_{n6} \end{pmatrix}.$$

For high dimensional vector field transformation h(x)=x−u(x), preferred test statistics become basis function projections $U_k = \langle \phi_k, u_n \rangle$, k=1, ..., D, and the preferred statistic U vector becomes $$U = \begin{pmatrix} U_1 = \langle \phi_1, u_n \rangle \\ U_2 = \langle \phi_2, u_n \rangle \\ \cdot \\ \cdot \\ \cdot \\ U_D = \langle \phi_D, u_n \rangle \end{pmatrix}. \tag{19}$$

Calculate Bayesian hypothesis test deciding on $H_0$=Normal, $H_1$=Disease using means and covariances $\bar{S}$, $\Sigma_S$, $\bar{U}$, $\Sigma_U$:

For testing on disease based on scale and or volume:

$$\log PH_0 \log \det\Sigma_S^N - [S - \bar{S}^N]^T (\Sigma_S^N)^{-1} [S - \bar{S}^N], \tag{20}$$

$$\log PH_1 \log \det\Sigma_S^D - [S - \bar{S}^D]^T (\Sigma_S^D)^{-1} [S - \bar{S}^D]. \tag{21}$$

For testing on disease based on high dimensional vector fields transformations:

$$\log PH_0 \log \det\Sigma^N - [U - \bar{U}^N]^T (\Sigma^N)^{-1} [U - \bar{U}^N], \tag{22}$$

$$\log PH_1 \log \det\Sigma^D - [U - \bar{U}^D]^T (\Sigma^D)^{-1} [U - \bar{U}^D]. \tag{23}$$

Figure 6:
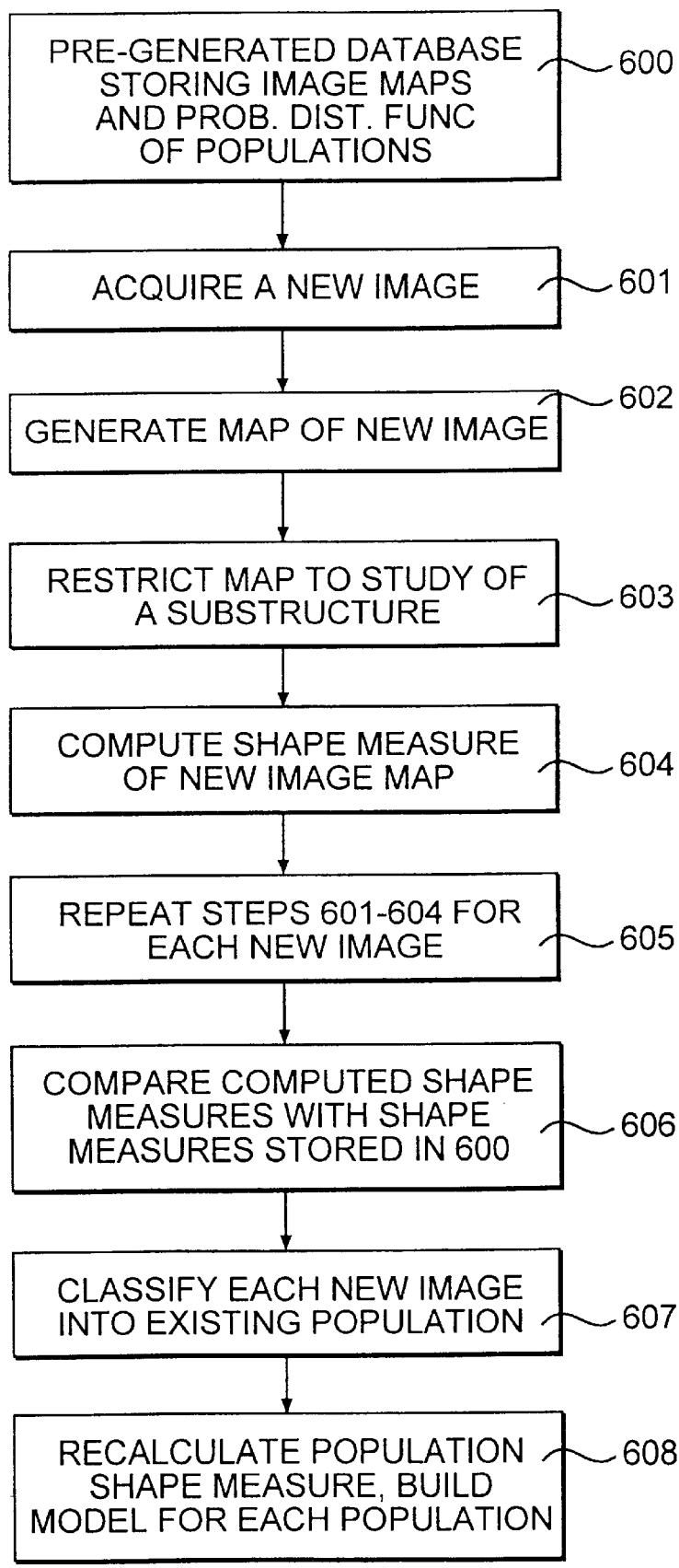
FIG. 6 is a flow chart representing the method of automatic shape characterization.
Figure 7:
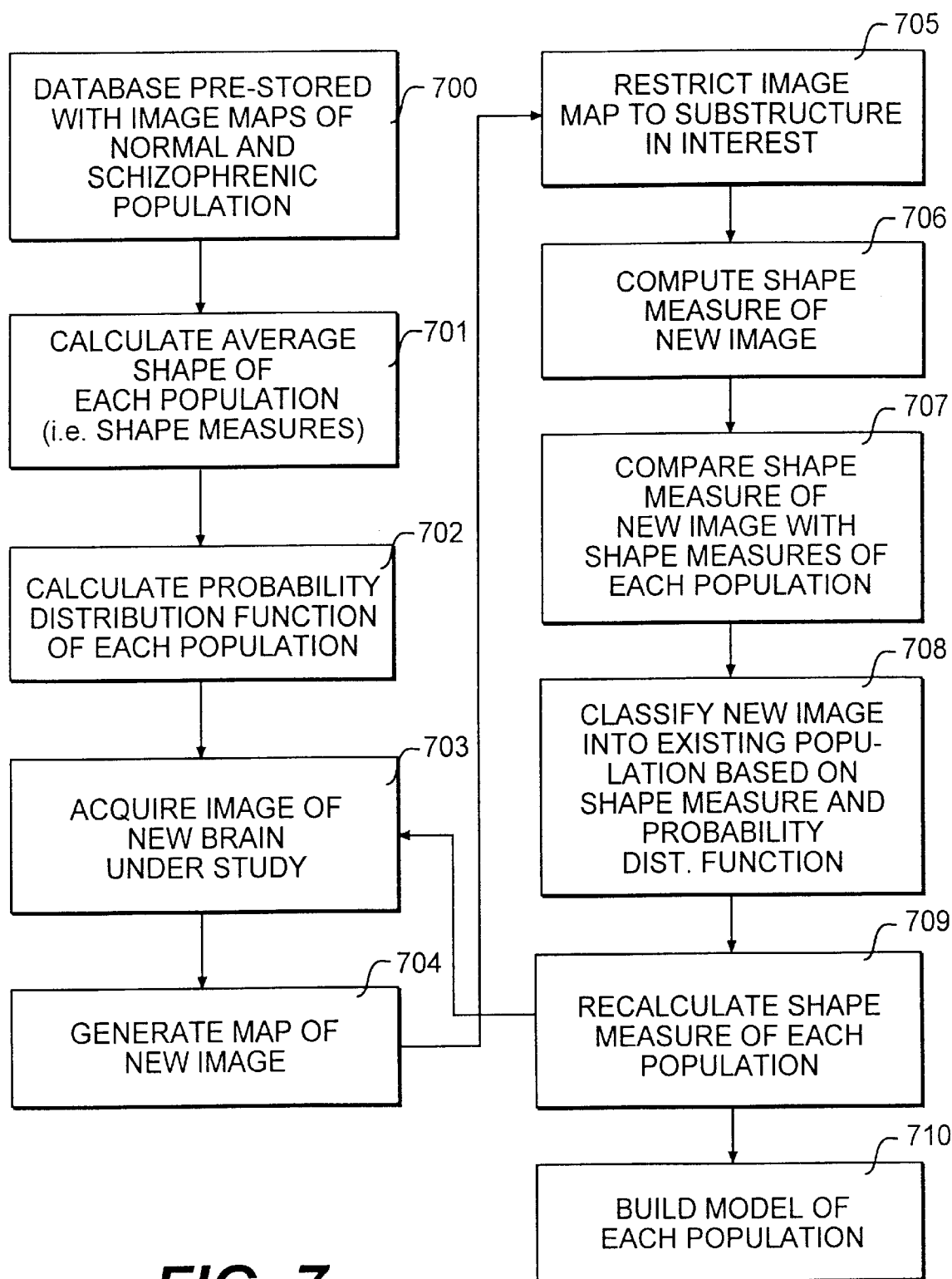
FIG. 7 is a flow chart representing the method of automatic shape characterization for use in diagnosing human brain disease.

FIGS. 6 and 7 depict a flow diagram representing the method described above. In FIG. 6, 600 shows a pregenerated database containing characteristic image map models and their corresponding probability distribution function. Each image map and corresponding probability function characterizes a particular population. The examination of a new image and structure of interest using conventional imaging techniques is shown at 601. 602 shows the generation of a map by applying the mapping transform to the image. The map is then restricted to study a substructure of interest 603. A shape measure is then computed at 604 for comparison with known population shape measures stored in the database. This step is repeated for each image to be studied 605. The map of the new image is compared with each image map characteristic of each population 606. A classification into an existing population is determined based on whether the new image's map falls within the probability distribution function of a particular population 607. Once the new image is properly classified into a population, the mean composite average shape map of that population is recalculated to account for the new shape's variation 608. This recalculated average shape allows the model of each class to be built and refined. Both the mean composite subvolume and the mean composite bounding surface are recalculated for the population. After the mean composite subvolume and the mean composite bounding surface are recalculated, the process is restarted for a new image at 600.

FIG. 7 depicts the simplified example of classifying various brain images into either a normal or schizophrenic population. A database is pre-stored with image maps of normal and schizophrenic brain images 700. Average shapes including mean composite subvolumes and mean composite bounding surfaces are calculated for each population 701 and stored in the database. The probability distribution function is also calculated 702. An image of a new brain to be studied is acquired using clinical examination techniques 703. These techniques include MRI, CT, and Ultrasound. A map of the new image is generated by mapping a template image stored in the database onto the new target image using a transform function 704. The new image map is restricted to a specific substructure of interest 705. In this example, the hippocampus of the brain is selected. A shape measure is then computed at 706 for comparison with known population shape measures stored in the database. The new image map is compared to the map of the average shape for either population 707. A classification into one of the populations is made based on whether the map of the new image falls within the probability distribution function of either population 708. Once the new image is classified as either normal or schizophrenic, the average shape of that population is recalculated to account for the variations in shape the new image has from the existing average shape 709. Steps 703–709 are repeated for each new brain image to be studied. A model including an average shape and probability distribution function of each class is recalculated to account for the variation in shape of each new image classified into a class 710.

The forgoing methods and apparatus described in detail above for biological applications can be also used in characterizing shape of non biological structures such as automated inspection of parts for quality control. The populations described above representing normal and disease states can be used to represent non-defective and defective parts as well as different classes of parts.

It should be noted that while the above example describes a binary hypothesis, multiple hypothesis may be utilized. Additional classifications of populations may be employed to further delineate structures that differ in shape characteristics.

Although the specification has described an embodiment drawn to detecting an classifying a diseased state of anatomical organs, the present invention may be applied to a wide variety of applications. Any application where deviations in shape characteristics of a structure might cause the structure to exhibit functional characteristics which deviate from the norm. For example, a machined component of a complex mechanical device may be produced with certain acceptable tolerances. The machined component may function properly within the entire devices, provided the component is machined within acceptable tolerances.

An embodiment consistent with the present invention might classify machined components as normal (i.e. within acceptable tolerances), diseased (i.e. defective). Additional classifications may be arranged for diseased components which match shape characteristics for other components which may, for example, be subjected to further machining into other functional components, or into a classification of a completely defective component which must not be used for any reasons an so on. Imaging machined components automatically as they are completed off the assembly line may provide an efficient quality control. In addition, defective parts may be categorized into classification which may be acceptable for recycling into other components. Defective parts with no functional value may be correctly classified and removed from the assembly line. Thus, complex devices may be efficiently manufactured and quality control maintained.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

We claim:

1. A method for building a statistical shape model for a class of subjects using shapes in images of the subjects comprising the steps of:

generating an image coordinate map from a volume matching transform relating a template image to an image of one of the subjects in the class;

computing a shape measure for a structure of interest from said image coordinate map;

repeating said generating and computing steps for a plurality of subjects in the class; and building a statistical shape model for said class from said computed shape measures.

2. A method for building a statistical shape model for a class of subjects using shapes in images of the subjects comprising the steps of:

generating an image coordinate map from a volume matching transform relating a template image to an image of one of the subjects in the class;

restricting said image coordinate map to a structure of interest in said image of one of the subjects;

computing a shape measure for said structure of interest from said image coordinate map;

repeating said generating, restricting, and computing steps for a plurality of subjects in the class; and building a statistical shape model for said class from said computed shape measures.

3. The method of claim 2, wherein the step of restricting said image coordinate map to a structure of interest includes the substep of:

identifying a point, line, surface, or subvolume in said image of one of the subjects.

4. The method of claim 2, wherein the step of building a statistical shape model includes the substep of:
   computing a probability distribution function representing said class.

5. A method for classifying a subject based on a shape in an image of the subject comprising the steps of:
   generating an image coordinate map from a volume matching transform relating a template image to a subject image;
   restricting said image coordinate map to a structure of interest in said image of one of the subjects;
   computing a shape measure for a structure of interest from said image coordinate map;
   comparing said shape measure to a statistical shape model representing a first class of subjects;
   comparing said shape measure to a statistical shape model representing a second class of subjects; and
   classifying said subject as belonging to said first class or said second class according to the result of said shape measure comparisons.

6. The method of claim 5, wherein the step of restricting said image coordinate map to a structure of interest includes the substep of:
   identifying a point, line, surface, or subvolume in said image of one of the subjects.

7. The method of claim 6, including the substep of generating a database by storing built statistical shape models that characterize different classes.

8. The method of claim 7, including the substep of comparing said computed shape measure of a new image to the statistical shape models of each different class of the database.

9. The method of claim 8, wherein the step of computing a shape measure for detailed high dimensional comparisons includes the substep of:
   computing a complete orthonormal expansion of the image coordinate map using basis vectors.

10. The method of claim 9, further including comparing the computed shape measure to the shape measure of each statistical shape model shape measure stored in the database.

11. The method of claim 8, wherein the step of computing a shape measure for scale groups comparisons includes the substep of:
   computing an expansion of the map using polar decomposition.

12. The method of claim 11, further including comparing the computed shape measure to the shape measure of each model shape measure stored in the database.

13. The method of claim 8, wherein the step of computing a shape measure for flip symmetry comparisons includes the substep of:
   computing an expansion of the map using polar decomposition with a determinant of −1.

14. The method of claim 13, further including comparing the computed shape measure to the shape measure of each model shape measure stored in the database.

15. The method of claim 8, wherein one of said comparing steps includes the substep of:
   computing a Bayesian hypothesis test.

16. A method for classifying a subject based on a shape in an image of the subject comprising the steps of:
   generating an image coordinate map from a volume matching transform relating a template image to a subject image;
   computing a shape measure for a structure of interest from said image coordinate map;
   comparing said shape measure to a statistical shape model representing a first class of subjects;
   comparing said shape measure to a statistical shape model representing a n-th class of subjects; and
   classifying said subject as belonging to anyone of first through n-th class according to the result of said shape measure comparisons.

17. A method for building a statistical shape model for a class of subjects having a disease using shapes in medical images of the subjects comprising the steps of:
   generating an image coordinate map from a volume matching transform relating a template image to an image of one of the subjects in the class;
   restricting said image coordinate map to an anatomical structure of interest in said image of one of the subjects;
   computing a shape measure for said anatomical structure of interest from said image coordinate map;
   repeating said generating, restricting, and computing steps for a plurality of subjects in the class; and
   building a statistical shape model for said class from said computed shape measures.

18. A method for classifying a disease state of a subject based on a shape of an anatomical region in an image of the subject comprising the steps of:
   generating a map from a volume matching transform relating a template image to a subject image;
   restricting said map to an anatomical structure of interest in said subject image;
   computing a shape measure for said structure of interest from said map;
   comparing said shape measure to a model representing a first class of subjects having one type of disease;
   comparing said shape measure to a model representing a second class of subjects having another type of disease; and
   classifying the disease state of said subject as belonging to said first class or said second class according to the result of said shape measure comparisons.

19. A method for classifying a disease state of a subject based on a shape of an anatomical region in an image of the subject comprising the steps of:
   generating a map from a volume matching transform relating a template image to a subject image;
   restricting said map to an anatomical structure of interest in said subject image;
   computing a shape measure for said structure of interest from said map;
   comparing said shape measure to a model representing a first class of subjects having one type of disease;
   comparing said shape measure to a model representing an n-th class of subjects having another type of disease; and
   classifying the disease state of said subject as belonging to any one of said first through n-th class according to the result of said shape measure comparisons.

20. An apparatus for building a statistical shape model for a class of subjects using shapes in images of the subjects comprising:
   a first computer processing unit for generating an image coordinate map from a volume matching transform relating a template image to an image of one of the subjects in the class;
   a first computer restricting unit for restricting said image coordinate map to a structure of interest in said image of one of the subjects;

a second computer processing unit for computing a shape measure for said structure of interest from said image coordinate map; and a database for building a statistical shape model for said class from said computed shape measures.

21. The apparatus of claim 20, wherein the first computer restricting unit for restricting said an image coordinate map to a structure of interest, further comprises:

an identification unit for identifying a point, line, surface, or subvolume in said image of one of the subjects.

22. The apparatus of claim 20, wherein said second processing unit for computing a shape measure, further comprises:

a microprocessor for computing a complete orthonormal expansion of the image coordinate map using basis vectors.

23. The apparatus of claim 20, wherein said second processing unit for computing a shape measure, further comprises:

a microprocessor for computing an expansion of the map using polar decomposition.

24. The apparatus of claim 20, wherein said second processing unit for computing a shape measure, further comprises:

a microprocessor for computing an expansion of the map using polar decomposition with a determinant of −1.

25. The apparatus of claim 20, wherein the database for building a statistical shape model, further comprises:

a third computer processing means for computing a probability distribution function representing said class.

26. An apparatus for classifying a subject based on a shape in an image of the subject comprising:

a first computer processor for generating an image coordinate map from a volume matching transform relating a template image to a subject image;

a first computer restricting unit for restricting said image coordinate map to a structure of interest in said subject image;

a second computer processor for computing a shape measure for said structure of interest from said image coordinate map;

a first comparator for comparing said shape measure to a statistical shape model representing a first class of subjects;

a second comparator for comparing said shape measure to a statistical shape model representing a second class of subjects;

an n-th comparator for comparing said shape measure to a statistical shape model representing an n-th class of subjects; and a classification unit for classifying said subject as belonging to any one of said first through n-th class according to the result of said shape measure comparisons.

27. The apparatus of claim 26, wherein the first computer restricting unit for restricting said image coordinate map to a structure of interest, further comprises:

an identification unit for identifying a point, line, surface, or subvolume in said image of one of the subjects.

28. The apparatus of claim 26, wherein the second computer processing unit for computing a shape measure, further comprises:

a microprocessor for computing a complete orthonormal expansion of the image coordinate map using basis vectors.

29. The apparatus of claim 26, wherein said second computer processing unit for computing a shape measure, further comprises:

a microprocessor for computing an expansion of the map using polar decomposition.

30. The apparatus of claim 26, wherein said second computer processing unit for computing a shape measure, further comprises:

a microprocessor for computing an expansion of the map using polar decomposition with a determinant of −1.

31. The apparatus of claim 26, wherein said first comparator for comparing said shape measure to a statistical shape model representing classes of shapes, further comprises:

a microprocessor for computing a Bayesian hypothesis test.

32. The apparatus of claim 26, wherein said second comparator for comparing said shape measure to a statistical shape model representing classes of shapes, further comprises:

a microprocessor for computing a Bayesian hypothesis test.

33. The apparatus of claim 26, wherein said n-th comparator for comparing said shape measure to a statistical shape model representing classes of shapes, further comprises:

a microprocessor for computing a Bayesian hypothesis test.

34. An apparatus for building a statistical shape model for a class of subjects having a disease using shapes in medical images of the subjects comprising:

a first computer processor for generating an image coordinate map from a volume matching transform relating a template image to an image of one of the subjects in the class;

a first computer restricting unit for restricting said image coordinate map to an anatomical structure of interest in said image of one of the subjects;

a second computer processor for computing a shape measure for said anatomical structure of interest from said image coordinate map;

a repeating means for repeating said generating, restricting, and computing steps for a plurality of subjects in the class; and a database for building a statistical shape model for said class from said computed shape measures.

35. An apparatus for classifying a disease state of a subject based on a shape of an anatomical region in an image of the subject comprising:

a first computer processor for generating a map from a volume matching transform relating a template image to a subject image;

a first computer restricting unit for restricting said map to an anatomical structure of interest in said subject image;

a second computer processor for computing a shape measure for said structure of interest from said map;

a first comparator for comparing said shape measure to a model representing a first class of subjects having one type of disease;

a second comparator for comparing said shape measure to a model representing a second class of subjects having another type of disease; and a classification unit for classifying the disease state of said subject as belonging to said first class or said second class according to the result of said shape measure comparisons.

36. A computer program product for use in a computer adapted for building a statistical shape model for a class of subjects using shapes in images of the subjects, the computer program product comprising a computer readable medium for storing computer readable code means, which when executed by the computer, enables the computer to build a statistical shape model, and wherein the computer readable code means includes computer readable instructions for causing the computer to execute a method comprising the steps of:

generating an image coordinate map from a volume matching transform relating a template image to an image of one of the subjects in the class;

computing a shape measure for a structure of interest from said image coordinate map;

repeating said generating and computing steps for a plurality of subjects in the class; and building a statistical shape model for said class from said computed shape measures.

37. A computer program product for use in a computer adapted for building a statistical shape model for a class of subjects using shapes in images of the subjects, the computer program product comprising a computer readable medium for storing computer readable code means, which when executed by the computer, enables the computer to build a statistical shape model, and wherein the computer readable code means includes computer readable instructions for causing the computer to execute a method comprising the steps of:

generating an image coordinate map from a volume matching transform relating a template image to an image of one of the subjects in the class;

restricting said image coordinate map to a structure of interest in said image of one of the subjects;

computing a shape measure for said structure of interest from said image coordinate map;

repeating said generating, restricting, and computing steps for a plurality of subjects in the class; and building a statistical shape model for said class from said computed shape measures.

38. A computer program product for use in a computer adapted for classifying a subject based on a shape in an image of the subject, the computer program product comprising a computer readable medium for storing computer readable code means, which when executed by the computer, enables the computer to classify a subject, and wherein the computer readable code means includes computer readable instructions for causing the computer to execute a method comprising the steps of:

generating an image coordinate map from a volume matching transform relating a template image to a subject image;

restricting said image coordinate map to a structure of interest in said image of one of the subjects;

computing a shape measure for a structure of interest from said image coordinate map;

comparing said shape measure to a statistical shape model representing a first class of subjects;

comparing said shape measure to a statistical shape model representing a second class of subjects; and classifying said subject as belonging to said first class or said second class according to the result of said shape measure comparisons.

* * * * *